Oct. 22, 1929.  E. G. N. SALENIUS  1,732,421
MILKING MACHINE
Filed Feb. 15, 1928  4 Sheets-Sheet 2
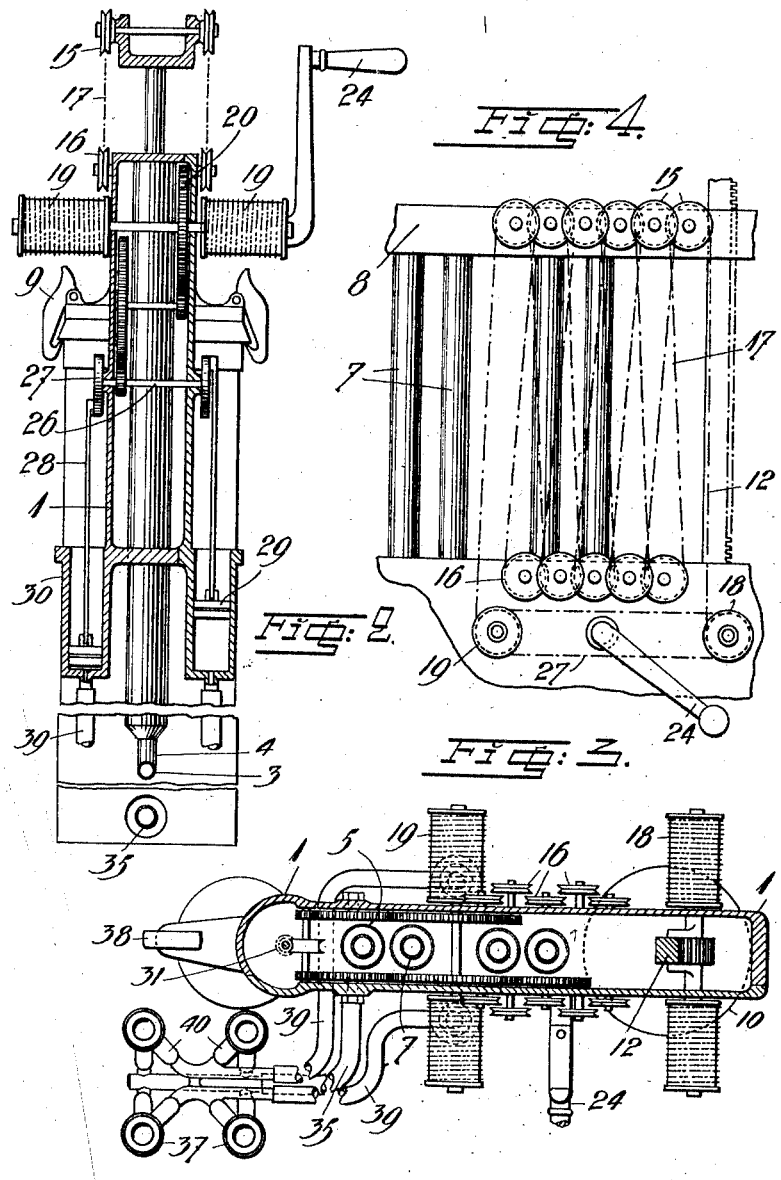
Eric Gustaf Nicolaus Salenius
INVENTOR;
By Otto Munk
his Attorney.

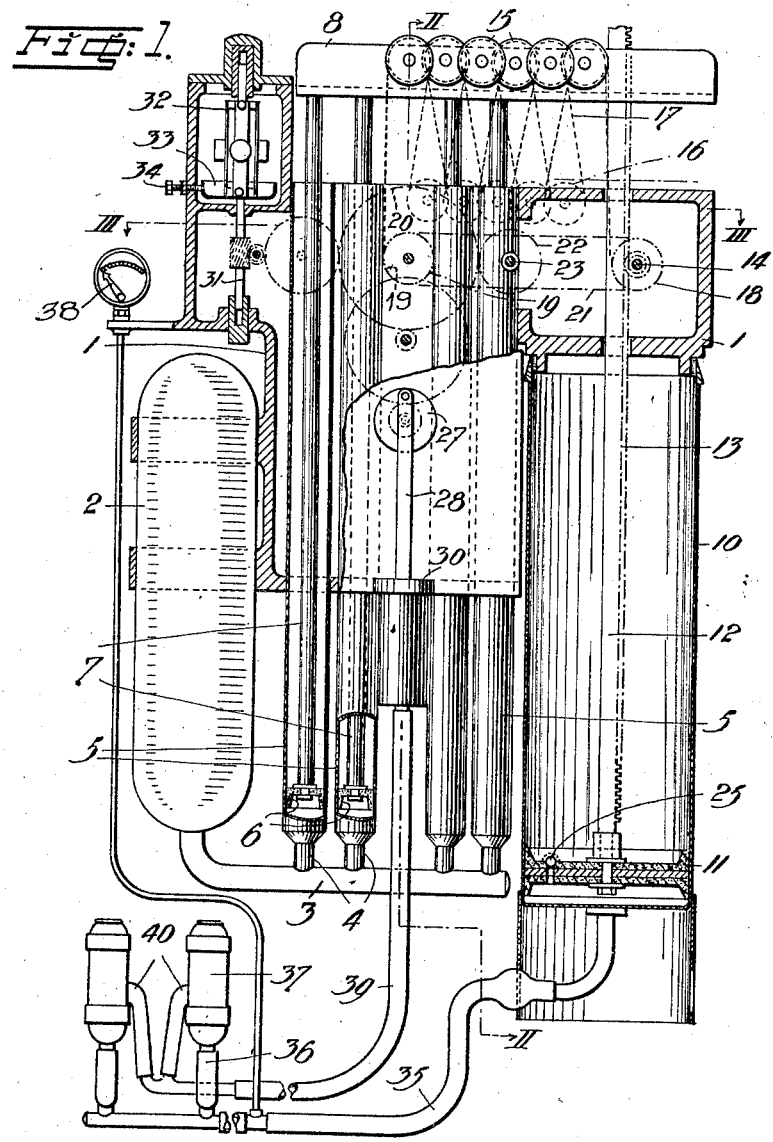

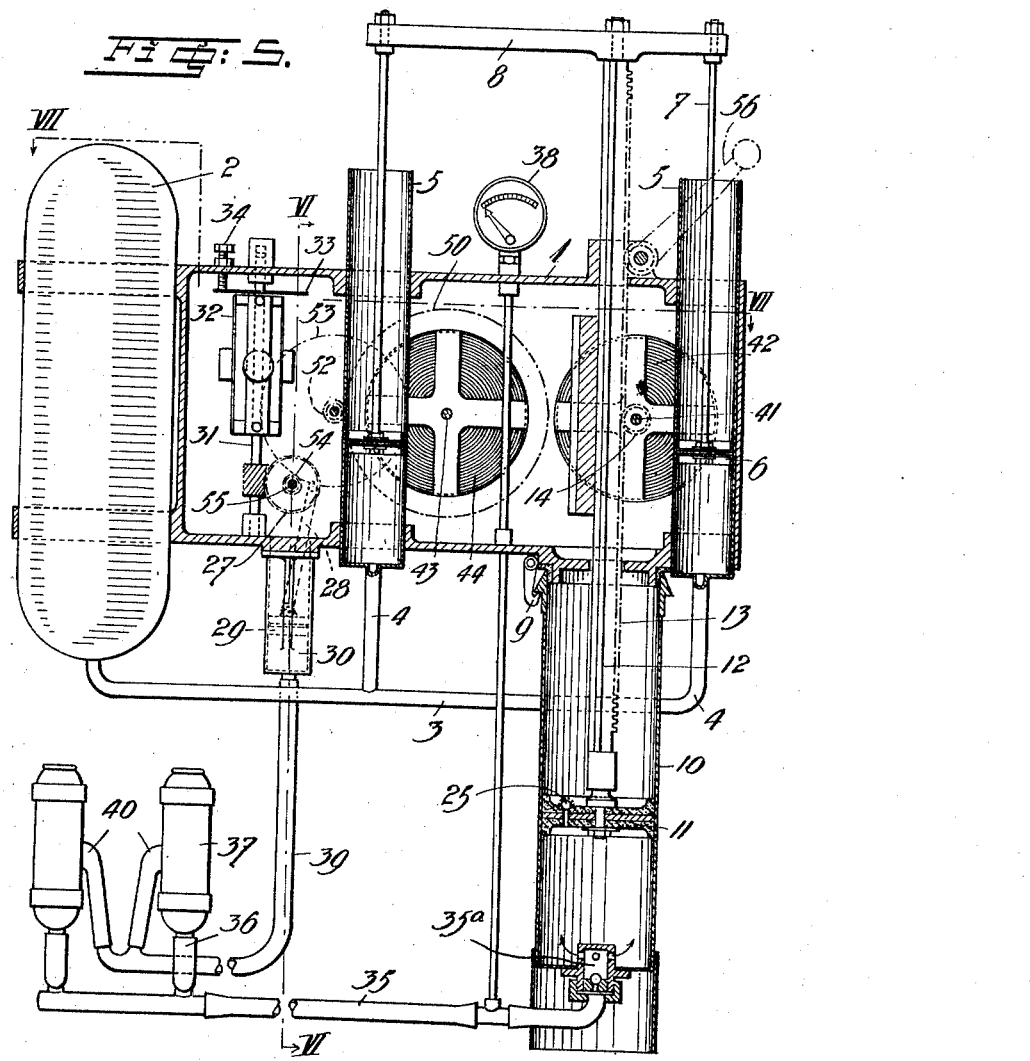

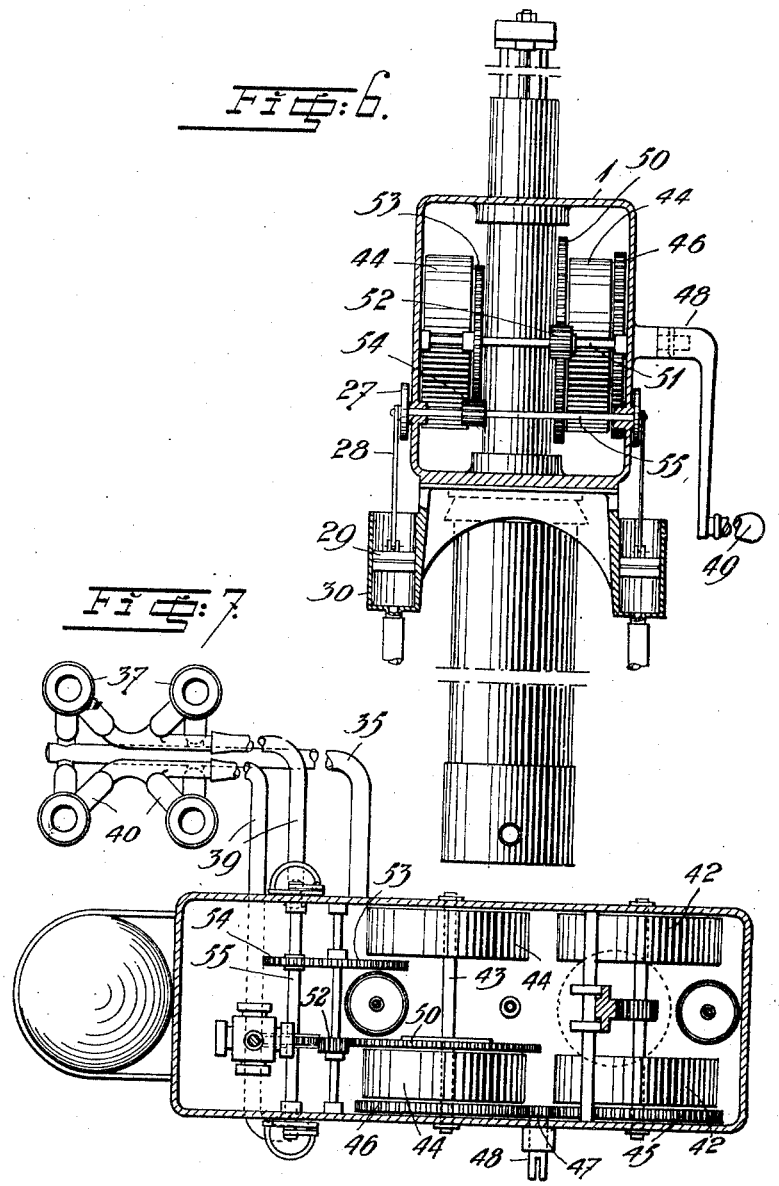

Patented Oct. 22, 1929

1,732,421

UNITED STATES PATENT OFFICE

ERIC GUSTAF NICOLAUS SALENIUS, OF STOCKHOLM, SWEDEN, ASSIGNOR TO ELISE SAMALIA SALENIUS, OF STOCKHOLM, SWEDEN

MILKING MACHINE

Application filed February 15, 1928, Serial No. 254,400, and in Sweden April 26, 1926.

My invention relates to milking machines and its object is to provide a self-contained complex, comprising an accumulator for compressed fluid, air for instance, working upon a suction-pump and pulsator pumps with conduits to the teat-cups, and a receiver for milk, the whole to be easily wound up by hand or motor. Since the several parts of the machine are combined into an isolated complex with its different parts acting automatically and in correct succession, and their movements being exactly regulatable, the machine can be made simple, cheap, and easily managed, and possessing its own source of power and being thus independent of special arrangements for transmission of power or conveyance of milk, the machine is easily transportable and independent of the place of milking so that it may be equally well used indoors as in the grazing field. A milking machine constructed according to this invention may be provided with a spring device for aiding in effecting a suction on the teat-cups and a pulsating pressure on the teats of the milch animal. The pressure fluid necessary for driving the machine is kept enclosed within it during a plurality of milking periods, which may extend over months or years, the initial pressure, which decreases during each milking operation, being automatically restored on each new winding up of the machine.

The essential parts of the machine are: An accumulator or receiver for pressure fluid, from which the pressure is conveyed to cylinders with pistons setting a member, the so-called "bridge", in a reciprocating motion for driving the different movable parts and pulsator pumps acted upon by the bridge by means of intermediate members and acting upon the space between the rigid wall of the teat-cup and the inflator, or flexible lining, a suction pump for conveying the milk to a collecting vessel, and a regulator with brake-disk for starting and stopping the machine and for regulating its speed, the whole mounted in an isolated stand.

The machine is illustrated in the accompanying drawings showing two forms of construction differing only in their means for regulating the movement of the so-called bridge and in modifications thereby caused with respect to the positions and arrangements of certain other members.

One form of construction is shown in Figs. 1, 2, and 3 respectively in elevation, partly in section, in vertical section on the line II—II, and horizontal section on line III—III in Fig. 1; and Figure 4 is a detail elevational view of a portion of the apparatus.

Another form of construction is shown in Figs. 5, 6, and 7 respectively in side elevation, in vertical section on the line VI—VI and in longitudinal section on the line VII—VII in Fig. 5.

In the frame 1 of the machine there is mounted a receiver 2 for pressure fluid, such as compressed air, for instance. At the bottom the receiver communicates with a pipe 3 which by means of branch pipes 4 is connected with cylinders 5 having pistons 6 whose rods 7 are connected with a movable part 8, hereinafter called the "bridge".

A cylinder 10 is by means of hooks or the like 9 removably connected with the frame or stand 1, the said cylinder being by means of a pipe or hose connected with the interior of the teat-cups 37. The cylinder 10 has a piston 11 with rod 12 connected with a rack-bar 13 in mesh with a toothed wheel 14.

A number of pulleys 15 are mounted on each side of the bridge 8, and a corresponding number of pulleys 16 are mounted on each side of the top portion of the stand 1. A wire 17 or the like is laid zigzag round the pulleys 15 and 16 on the same side of the machine, as will be seen from Figs. 1 and 4. The two wires 17 are at one end connected with rollers 18 mounted in the stand and carried by the same shaft as the toothed wheel 14. At the other end, the wires 17 are connected with rollers 19, which are carried by a shaft mounted in the stand and carrying a toothed wheel 20. The rollers 18 and 19 are mutually connected by a chain or chains 21 and thus rotate in the same direction, so that the wires 17 will be wound on or off the rollers 18 and 19 at the same time and to equal length. The toothed wheel 20 gears with a toothed wheel 22 carried by a shaft 23 which is mounted in the stand 1 and has a crank 24 on its end projecting outside the stand (Figs. 2 and 4). By turning the crank with the sun (clockwise, Fig. 1), the wheel 20 and all of the rollers 18 and 19 will be brought to rotate against the sun, so that the wires 17 are wound on the rollers, and the bridge will be lowered towards the cylinders 5 and 10, the pistons 6 being driven downwards in the cylinders 5 and pressing the air back into the receiver 2. The wires 17 and the pulleys 15 and 16 thereby act like a pulley-tackle exerting additional pressure on the pistons 6 against the pressure of the air contained in the receiver 2. At the same time the piston 11 is pressed down in the cylinder 10 on account of the wheel 14 working on the rack 13 of the piston rod 12, and air or milk contained beneath the piston 11 will be let out through a valve 25 in the piston.

By means of a gearing the wheel 20 acts upon a shaft 26 mounted in the stand 1 and connected with cranks or eccentrics 27, whose journals, by means of links 28, are connected with the pistons 29 in cylinders 30 connected with the teat-cups by means of conduits 39.

By means of another gearing the wheel 20 drives a shaft 31 mounted in the stand and provided with a regulator 32. A screw 34 passing through the stand works upon a brake-disc 33 carried by the shaft 31 and intended to regulate the speed of the shaft 31 and consequently the speed of all the moving parts of the machine, or to interrupt the movements, when forcibly pressed against the brake-disc.

Those wheels belonging to the two gearings, which are in gear with the toothed wheel 20, are connected with their respective shafts by means of catches so arranged that the first-named wheels, when the machine is being wound up by means of the crank 24, are disconnected from their shafts, but otherwise coupled to them, so that the respective parts (pumps and regulator) are disengaged only when the machine is wound up.

The cylinder 10 and the pumping means 29, 30 are, as above stated, in communication with the teat-cups 37. The space beneath the piston 11 in the cylinder 10 is by a conduit 35 and branch pipes 36 in communication with the spaces comprised within the inflators in which the teats are placed during the milking process. A suction valve (not shown) is preferably arranged between the cylinder 10 and the conduit 35.

This conduit 35 opens into a vacuum-meter 38, by which the degree of suction in the teat-cups can be read in order to be regulated by the screw 34 working on the brake-disc 33. The conduit 39 from the cylinders 29, 30 communicated through branch conduits 40 with the spaces outside the inflators in the teat-cups.

A valve (not shown) is arranged at any suitable point (preferably on the pipe 3) for forcing air, or other fluid, into the receiver 2.

The machine works in the following manner: It is supposed that the machine has been run so far that the pistons 6 and 11 in the respective cylinders 5 and 10 have reached their upper final positions, which are determined by the piston 11 striking against the stand 1. If then the crank 24 is turned round, the wires 17 will be wound upon the rollers 18 and 19, and the pulleys 15, 16 together with the wires 17 act like a pulley-tackle bringing down the bridge 8, the pistons 6 and 11 thus being brought into their initial positions in the cylinders 5 and 10 respectively. The air beneath the pistons 6 in the cylinders 5 will then be forced through the pipe 3 into the receiver 2, in which the pressure will be raised, and the air beneath the piston 11 in the cylinder 10 escapes through the valve 25. After the machine has been wound up in this manner, the screw 34 is screwed against the brake-disc 33, so that the different parts of the machine are kept in their initial positions. By slackening the screw 34 a little, the machine is started. The air comprised in the receiver 2 will force the pistons 6 in the cylinders 5, and accordingly the bridge 8, upwards, in consequence whereof the wires 17 are wound off the rollers 18 and 19 (see Figs. 1 and 4). The winding off of the wires from the rollers 18 brings the toothed wheel 14 to rotate, so that the rack 13 will lift the piston 11. The rarefaction of the air thus taking place in the space beneath the piston 11 will cause milk to be drawn from the teats through the conduit 35 into the cylinder 10, or into a vessel connected therewith and in which a rarefaction of the air contained therein is also caused by the rising movement of the piston 11. The winding off of the wire 17 from the rollers 19 brings the toothed wheel 20 to rotate and to start the pumps 29, 30, so that the teats are subjected to a pulsating pressure giving them the requisite massage, and also to set the regulator 32 and the brake disc 33 in rotation. The speed of the movable parts of the machine can be regulated by means of the screw 34, so that the machine can at any time be adapted to varying conditions.

After the cylinder 10 and the vessel (which may be connected therewith) have been filled with milk and removed (by unhooking the hooks 9), emptied, and replaced, the machine is again wound up in the aforesaid manner and checked in this position by tightening the screw 34 against the brake-disc 33 and so on.

In second form of construction another arrangement is chosen for moving the bridge 8, from which power is transmitted to the pistons 6.

A pair of watch-springs 42 are fixed to the shaft 41 mounted in the stand and carrying the toothed wheel 14, and another pair of watch-springs 44 are fixed to a shaft 43 also mounted in the stand. The shafts 41 and 43 carry toothed wheels, 45 and 46 respectively, engaging with a pinion 47 fixed to a short shaft 48 mounted in the stand. That end of this shaft which projects out of the stand, carries a crank 49, by means of which the machine is to be wound up, and during this process the springs 42 and 44 are tightened, and the pistons 6 and 11 are lowered in their cylinders 5 and 10 owing to the wheel 12 working on the rack 13.

On the shaft 43 is fixed a toothed wheel 50 engaging with a pinion 51 on a shaft 52 mounted in the stand, this shaft carrying a toothed wheel 53 engaging with a pinion 54 carried on a shaft 55 mounted in the stand. This latter shaft carries the cranks or eccentrics 27 acting upon the pistons 29.

The shaft 55 acts upon a gearing for driving the spindle 31 together with the regulator 32.

By means of a pawl device the toothed wheel 51 is connected with the shaft 52, so that, when the machine is being wound up by means of the crank 49, the toothed wheel 51 is disengaged from its shaft, but otherwise it is coupled to it. A suction-valve 35ª is arranged between the cylinder 10 and the conduit 35.

In this form the machine works in the following manner: By turning the crank 49 the springs 42 and 44 are tightened and owing to the toothed wheel engaging with the rack 13 the pistons 6 and 11 are driven downwards to their initial positions in the cylinders 5 and 10 respectively. The machine is then run in the aforesaid manner. The degree of pressure from the receiver 2 is increased by the pressure of the springs 42 and 44, so that power will be transmitted by the toothed wheel 14 to the rack 13 and the rod 12. When the springs distend, the pumping device 29, 30 is set in motion for working on the teat-cups in the aforesaid manner.

If desired, the machine may be wound up by acting upon the rod 14 by a crank, for instance.

This form of construction presents a special advantage, inasmuch as it can be used equally well for hard-milked and easily milked animals. In the latter case only one of the driving means (springs or air pressure), but in the former case both of them are to be used. The total amount of power can be regulated by regulating the pressure from the air and the springs, or either.

Provided the receiver 2 and the cylinders 5 and the conduits connecting these members are prefectly tight, a leakage through which pressure fluid might escape, could only occur round the pistons 6. By a special construction of the pistons (independent of the present invention), such leakage may be practically prevented. With such a construction of the pistons, the machine is at any time ready to be put to work without wasting time in pumping in pressure fluid.

From the above it will be seen that all parts of the machine are positively guided so as to operate regularly together, thus ensuring a satisfactory milking.

The arrangements of the details and the mode of transmitting motion may vary without departing from the spirit of the invention.

Having now described my invention, what I claim as new and desire to secure by Letters Patent is:

1. A milking machine, including a receiver for pressure fluid, a motor driven by the said pressure fluid, and acting on a suction device for drawing milk from teat-cups, pulsator members acting on said teat-cups, and a frame, supporting all said means, so as to form an automatically working self-contained complex, independently of any source of power outside of it.

2. A milking machine, including a receiver for pressure fluid, a motor driven by the said pressure fluid and acting on a suction pump for drawing milk from teat-cups, pulsator members acting on said teat-cups, and a device for regulating the speed of the machine, all of which parts are positively guided to cooperate and combined into an automatically working self-contained complex containing its own source of power and being independent of any driving means outside of it, the whole being carried in an easily transportable frame and adapted to be connected with the teat-cups.

3. A milking machine, including a receiver for pressure fluid, a motor driven by the said pressure fluid and acting on a suction pump for drawing milk from teat-cups, pulsator members acting on said teat-cups, and a device for regulating the speed of the machine, all of which parts are positively guided to cooperate and combined into an automatically working self-contained complex containing its own source of power and being independent of any driving means outside of it, the whole being carried in an easily transportable frame and adapted to be connected with the teat-cups, said accumulator acting upon a number of pistons connected with a movable member, which is directly and operatively connected with a suction device communicating with the interior of the teat-cups, the pulsator members communicating with a space between the teat-cups and the inflators.

4. A milking machine, including a receiver for pressure fluid, a motor driven by the said pressure fluid and acting on a suction pump for drawing milk from teat-cups, pulsator members acting on said teat-cups, and a device for regulating the speed of the machine, all of which parts are positively guided to cooperate and combined into an automatically working self-contained complex containing its own source of power and being independent of any driving means outside of it, the whole being carried in an easily transportable frame and adapted to be connected with the teat-cups, said accumulator acting upon a number of pistons, connected with a movable member, which is operatively connected by suitable intermediate means with a suction device, communicating with the interior of the teat-cups, the pulsator-members communicating with a space between the teat-cups and the inflators.

5. A milking machine, including a receiver for pressure fluid, a motor driven by the said pressure fluid and acting on a suction pump for drawing milk from teat-cups, and pulsator members acting on said teat-cups, all of which parts are positively guided to cooperate and combined into an automatically working self-contained complex containing its own source of power and being independent of any driving means outside of it, the whole being carried in an easily transportable frame and adapted to be connected with the teat-cups, a brake-disk fixed on the spindle of the regulator and acted upon by a screw in the frame of the machine, in order to enable the machine to be started and to regulate its speed or to stop the machine when wound up.

6. A milking machine, including a receiver for pressure fluid, a motor driven by the said pressure fluid and acting on a suction pump for drawing milk from teat-cups, and pulsator members acting on said teat-cups, all of which parts are positively guided to cooperate and combined into an automatically working self-contained complex containing its own source of power and being independent of any driving means outside of it, the whole being carried in an easily transportable frame and adapted to be connected with the teat-cups, said accumulator acting upon a number of pistons connected with a movable member, which is directly and operatively connected with a suction device communicating with the interior of the teat-cups, the pulsator members communicating with a space between the teat-cups and the inflators, and a regulator for regulating the speed of the machine, a brake-disk fixed on the spindle of the regulator and acted upon by a screw in the frame of the machine, in order to enable the machine to be started and to regulate its speed or to stop the machine when wound up.

7. A milking machine, including a receiver for pressure fluid, a motor driven by the said pressure fluid and acting on a suction pump for drawing milk from teat-cups, and pulsator members acting on said teat-cups, all of which parts are positively guided to cooperate and combined into an automatically working self-contained complex containing its own source of power and being independent of any driving means outside of it, the whole being carried in an easily transportable frame and adapted to be connected with the teat-cups, said accumulator acting upon a number of pistons, connected with a movable member, which is operatively connected by suitable intermediate means with a suction device, communicating with the interior of the teat-cups, the pulsator-members communicating with a space between the teat-cups and the inflators and a regulator for regulating the speed of the machine, a brake-disk fixed on the spindle of the regulator and acted upon by a screw in the frame of the machine, in order to enable the machine to be started and to regulate its speed or to stop the machine when wound up.

8. A milking machine, including a receiver for pressure fluid, a motor driven by the said pressure fluid and acting on a suction pump for drawing milk from teat-cups, pulsator members acting on said teat-cups, and a device for regulating the speed of the machine, all of which parts are positively guided to cooperate and combined into an automatically working self-contained complex containing its own source of power and being independent of any driving means outside of it, the whole being carried in an easily transportable frame and adapted to be connected with the teat-cups, said accumulator acting upon a number of pistons connected with a movable member, which is directly and operatively connected with a suction device communicating with the interior of the teat-cups, the pulsator members communicating with a space between the teat-cups and the inflators and means for bringing the movable member to its initial position against the pressure from the accumulator acting upon the pistons, said means consisting of a rack on the piston-rod of the suction pump engaging with a toothed wheel to which motion is given by a crank.

9. A milking machine, including a receiver for pressure fluid, a motor driven by the said pressure fluid and acting on a suction pump for drawing milk from teat-cups, pulsator members acting on said teat-cups, and a device for regulating the speed of the machine, all of which parts are positively guided to cooperate and combined into an automatically working self-contained complex containing its own source of power and being independent of any driving means outside of it, the whole being carried in an easily transportable frame and adapted to be connected with the teat-cups, said accumulator acting upon a number of pistons connected with a movable member, which is directly and operatively connected with a suction device communicating with the interior of the teat-cups, the pulsator members communicating with a space between the teat-cups and the inflators, and means for moving the movable member, said means consisting of a system of pulleys and cords and a number of rollers mounted in the frame and the movable member, the said system being set in motion on turning the crank for bringing the movable member into initial position.

In witness whereof, I have hereunto signed my name.

ERIC GUSTAF NICOLAUS SALENIUS.